(12) United States Patent
Ciemiewicz et al.

(10) Patent No.: US 8,832,101 B2
(45) Date of Patent: Sep. 9, 2014

(54) AUTOMATED USER BEHAVIOR FEEDBACK SYSTEM FOR WHOLE PAGE SEARCH SUCCESS OPTIMIZATION

(75) Inventors: David Ciemiewicz, Mountain View, CA (US); Ya Zhang, Sunnyvale, CA (US); Belle Tseng, Cupertino, CA (US); Jean-Marc Langlois, Alameda, CA (US)

(73) Assignee: Yahoo! Inc., Sunnyvale, CA (US)

( * ) Notice: Subject to any disclaimer, the term of this patent is extended or adjusted under 35 U.S.C. 154(b) by 556 days.

(21) Appl. No.: 12/708,499

(22) Filed: Feb. 18, 2010

(65) Prior Publication Data
US 2011/0202522 A1 Aug. 18, 2011

(51) Int. Cl.
*G06F 17/30* (2006.01)
(52) U.S. Cl.
CPC .............................. *G06F 17/30867* (2013.01)
USPC ....................................................... 707/734
(58) Field of Classification Search
CPC .................... G06F 17/30867; G06F 17/30887
USPC ....................................................... 707/734
See application file for complete search history.

(56) References Cited

U.S. PATENT DOCUMENTS

| | | | | |
|---|---|---|---|---|
| 6,549,944 B1 * | 4/2003 | Weinberg et al. | ............. | 709/224 |
| 7,610,282 B1 | 10/2009 | Datar et al. | | |
| 7,809,801 B1 * | 10/2010 | Wang et al. | .................... | 709/217 |
| 8,196,063 B2 * | 6/2012 | Apparao et al. | ............. | 715/811 |
| 2007/0038634 A1 * | 2/2007 | Glover et al. | ................... | 707/10 |
| 2007/0271230 A1 * | 11/2007 | Hart et al. | .......................... | 707/3 |
| 2008/0281817 A1 * | 11/2008 | White et al. | ...................... | 707/6 |
| 2009/0271374 A1 * | 10/2009 | Korn et al. | ......................... | 707/3 |
| 2010/0082673 A1 * | 4/2010 | Nakano et al. | ................ | 707/776 |

OTHER PUBLICATIONS

Mazlita Mat-Hassan & Mark Levene, "Associating Search and Navigation Behavior Through Log Analysis", Journal of the American Society for Information Science and Technology, 56(9):913-934 (2005).*
Janez Brank et al., "Predictive Algorithms for Browser Support of Habitual User Activities on the Web", Proceedings of the IEEE/WIC/ACM International Conference on Web Intelligence (2005).*

(Continued)

*Primary Examiner* — Rehana Perveen
*Assistant Examiner* — Scott A Waldron
(74) *Attorney, Agent, or Firm* — Hickman Palermo Truong Becker Bingham Wong LLP; Edwards A. Becker

(57) ABSTRACT

Various users' navigational behaviors relative to search results presented by a search engine are monitored. URLs that are visited and revised queries that are submitted after the submission of an original query are placed within a trail that begins with the original query. These trails are grouped based on the original queries with which they begin. For each trail group, a set of URLs that frequently occur in that group's trails, and a set of revised queries that frequently occur in that group's trails, are determined. These frequently occurring elements are mapped to the original queries with which all the trails in the corresponding trail group begin. In response to subsequent submissions of the same original query, the search engine ensures that URLs and revised queries that are mapped to the original query are prominently displayed on the search results pages that are initially returned in response to those submissions.

20 Claims, 4 Drawing Sheets

(56) References Cited

OTHER PUBLICATIONS

Jose Borges & Mark Levene, "Evaluating Variable-Length Markov Chain Models for Analysis of User Web Navigation Sessions", IEEE Transactions on Knowledge and Data Engineering, 19(4):441-452 (Apr. 2007).*

Maurice Coyle & Barry Smyth, "Supporting Intelligent Web Search", ACM Transactions on Internet Technology, vol. 7, No. 4 (Oct. 2007).*

Mikhail Bilenko & Ryen White, "Mining the Search Trails of Surfing Crowds: Identifying Relevant Websites from User Activity", ACM WWW: Data Mining—Log Analysis (Apr. 2008), pp. 51-60.*

* cited by examiner

AUTOMATED USER BEHAVIOR FEEDBACK SYSTEM FOR WHOLE PAGE SEARCH SUCCESS OPTIMIZATION

FIELD OF THE INVENTION

Embodiments of the invention pertain generally to the field of search engines.

BACKGROUND

A variety of mechanisms are available to help users search and navigate electronic information. For example, many electronic resources employ a search engine to help users locate information. To locate information on a particular topic, a search engine allows users to submit one or more search query terms related to a topic of interest. In response, the search engine executes the search query, consults its indexes, and generates information about the results of the search. The information about the results of the search, referred to herein as the "search results," usually contains a list of resources that satisfy the search query and some attributes of those sources.

For example, the search engine's index might associate, with each particular keyword in a known universe of keywords, a set of web pages (identified potentially by the Universal Resource Locators (URLs) of those web pages) that were previously discovered (e.g., by an automated web crawler program) to contain at least one instance of that particular keyword. When a user enters a query that includes the particular keyword, the search engine may generate the search results at least in part by locating the keyword in the index and determining the set of web pages that are associated with that keyword. The search engine may determine a separate set in like manner for each separate keyword that occurs in a user-submitted query, and then determine the intersection of the sets (which will be the set of web pages that include all of the query's keywords) in order to determine which search results ought to be presented on the search results page that the search engine returns to the user in response to the submission of the query to the search engine. In generating the search results page, the search engine may rank and order the search results to be presented based on relevance, for example (which might be determined based at least in part on the frequencies, locations, or contexts of the queries' keywords within the web pages within which those keywords are found), such that search results deemed to be more relevant to the query are positioned or otherwise displayed more prominently (e.g., earlier or higher up) in the search results page than are other search results deemed to be less relevant to the query.

More sophisticated search engines often include, along with one or more of the search results shown on the search results page, "quick links" that point to specific destinations within the web site to which search results refer. For example, when a search result for the "Yahoo!" web site appears, along with a link to a general home page for "Yahoo!" the search results may include quick links to: mail, messenger, games, music, answers, maps, etc. These quick links help to enable a user to "jump" directly to the content in which he is specifically interested, so that the user does not need to navigate first to the general home page of the web site in search for links, from that home page, to other pages that feature the content in which he is specifically interested. This saves the user time and effort.

However, the presence of these quick links on the search results page can also complicate and crowd the search results page. The presence of these quick links can force other search results further down onto the search results page, or even onto a subsequent search results page that the user might or might not view. Therefore, when quick links in which the user is not likely to be interested are presented along with a search result, the display of those quick links can produce a net detriment rather than a net benefit on the user's search experience.

The more complicated a search results page becomes, the less likely it is that a user will notice that the search results page already contains a search result that matches what the user is looking for with a high degree of precision. When such a search result is "buried" within a tangle of other information, the user might simply enter a new query into the search engine query box after reading the first two or three search results, rather than scanning further down the page for the search result that would truly satisfy the user's information desire. The user might repeat this behavior several times before submitting, to the search engine, a query that causes the interesting search result to appear prominently enough on a search result page that the user selects it and remains at it for a significant amount of time. The user might not be aware that the same interesting search result also previously appeared on one or more of the search result pages that the user previously received from the search engine. Thus, the user wastes time and effort finding a resource that he could have reached earlier, had that resource been more prominently featured on a prior search results page.

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
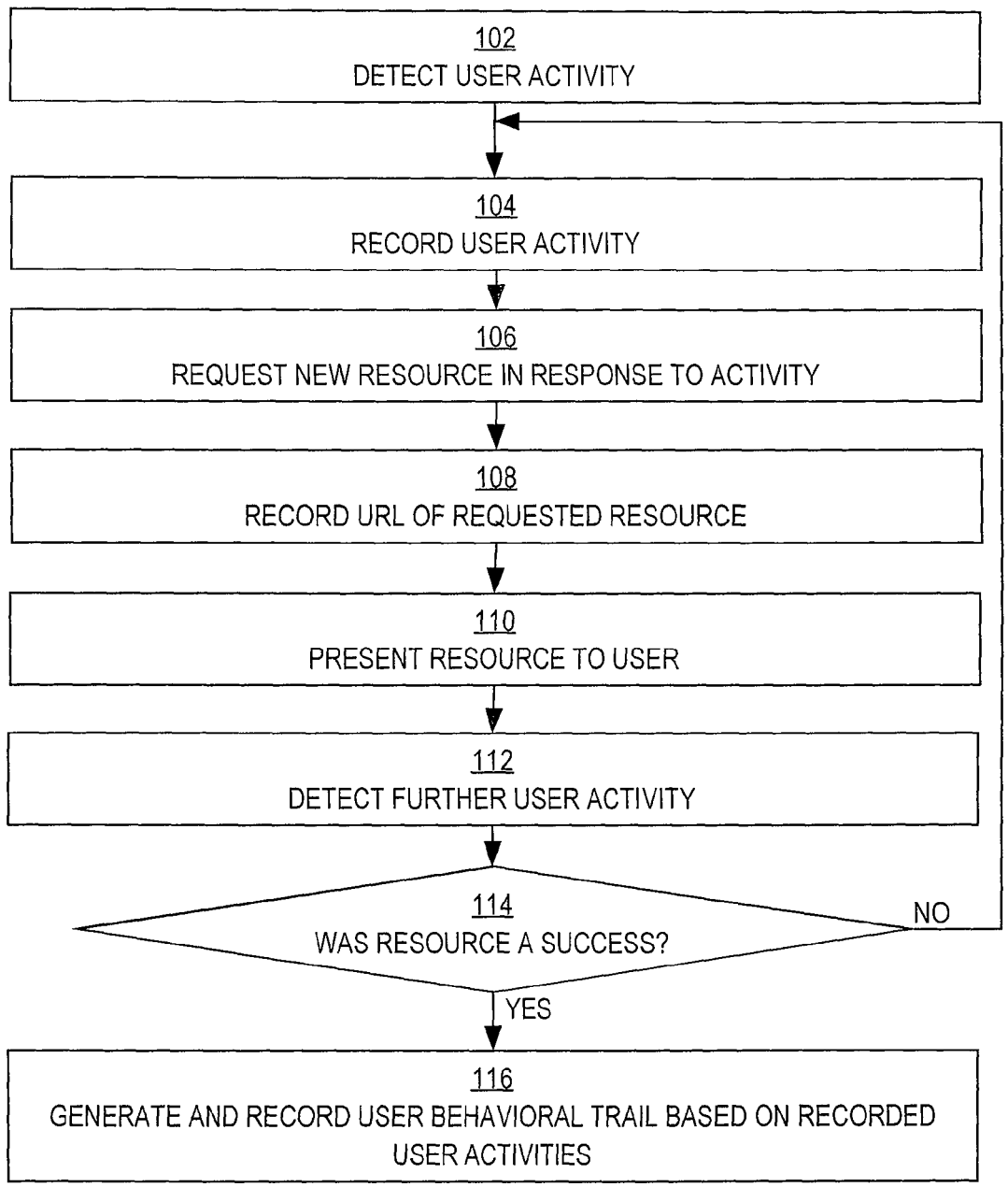
FIG. 1 is a flow diagram that illustrates an example of a technique for collecting and reporting a user's behavioral navigation trail, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Techniques disclosed herein cause search results pages returned by an Internet search engine (e.g., the Internet search engine provided by Yahoo! Inc.) to be more likely to feature, prominently, search results in which a user is likely to be interested given the query that he submitted to the search engine. According to one embodiment of the invention, after receiving a query from a user and returning an initial search results page, the search engine detects that the user has selected a particular search result on that page. Typically, the user will select the search result by mouse-clicking on a hypertext link that is displayed within the search result. The search engine stores data that indicates that the particular search result was selected after submission of the query. The stored data associates the query with the particular search result.

The user might not linger very long on the page to which his browser was directed after the user clicked on the particular search result. The user might not linger on this page for any significant amount of time due to the fact that the user quickly determines that the page's content does not actually interest him. The user might use the "back" navigation control of his browser application to return to the initial search results page and select another search result from the search results shown on the page. When the user does so, the search engine appends, to the data discussed above, information that indicates that the user subsequently selected the other search result. Thus, the query that the user originally entered also becomes associated with the other search result. The data that is stored comes to represent the user's navigation behavior after submitting the query. For each search result that the user selects, the search engine augments the data that is associated with the query to indicate that the user has subsequently selected that search result. Thus, the data comes to represent an ordered, sequential trail of search results that the user selected, and an ordered, sequential trail of pages that the user visited in consequence of the submitted query. The whole trail is associated with the query in the stored data.

Because he might not be satisfied with any of the search results that are presented on the initial search results page, the user might, subsequent to the entry of the initial query, enter a different, revised query, in hopes that the search engine will present, on a revised search results page, search results that are more interesting to the user than the search results that were contained in the initial search results page returned in response to the original query. According to an embodiment of the invention, under circumstances in which the user submits a revised query in this manner, the search engine appends, to the "trail" data associated with the original query (discussed above), information that indicates that the user subsequently submitted a revised query. The revised query therefore becomes a part of the behavioral navigation trail that is associated with the original query. Search results that the user subsequently selects from the revised search results page (that is, the search results page that the search engine returns in response to the submission of the revised query) are also appended to the behavioral navigation trail that is associated with the original query.

The above process may continue for any number of search result selections and revised query submissions. In one embodiment of the invention, the search engine keeps track of how long the user spends on each page to which a selected search result refers. For example, the search engine may do so by tracking the quantity of time that passes in between user activities such as search result selections and revised query entries. In such an embodiment of the invention, the search engine determines whether the quantity of time that has passed since the user's most recent navigation activity exceeds some specified threshold. In response to determining that this quantity of time exceeds the specified threshold, the search engine determines that the user has finally found an information resource in which the user is actually interested (because the user has spent a significant quantity of time on that page). Thus, the search engine determines that the selection of the search result that led to that page was a "success" for the user. The search engine therefore updates the behavioral navigation trail data that is associated with the original query to indicate that the most recent search result selection was a "success."

In one embodiment of the invention, the search engine observes and maintains such user behavioral trail data for a multitude of different users over a long period of time. Over this period of time, the search engine records user behavioral trail data for a variety of different original queries that different users submitted to the search engine. Some users might enter the same original query as other users, and might subsequently produce navigation trails that are similar in some respects to other trails already recorded for the same original query, but also possibly different in other respects. The search result that is a "success" for one user after submitting a particular original query might not be a "success" for another user after submitting that particular original query. However, over time, the search engine may discover that multiple different navigational trails, observed from different users submitting the same original query, tend to contain similar "successes." For example, the search engine may discover that a significant proportion of the users who originally submitted a particular query all ultimately ended up (perhaps after following different trails) spending more than the threshold amount of time on a particular page to which a particular search result referred. If this proportion is sufficiently significant, then the search engine determines that the particular search result is one that should be prominently featured on the original search results page (that is, the search results page that is presented in direct response to a user's submission of the original query).

According to one embodiment of the invention, upon determining in the above manner that a particular search result should be prominently featured on a particular original query's initial search results page, the search engine stores rank adjustment data that associates the particular original query with the particular search result. Thereafter, whenever any user submits the particular original query, the search engine consults the rank adjustment data to determine whether the particular original query is associated with any search results. In one embodiment of the invention, the search engine promotes the ranks of all search results that are associated with the particular original query such that those search results appear "higher" or more prominently on the original search results page than those search results otherwise would have. For example, even if a particular search result would otherwise be located outside of the top 3 or so search results presented on the particular original query's initial search results page (for example, because that particular search result has a lower relevance-rank score with regard to the particular original query than do other search results), the association of the particular search result with the particular original query in the rank adjustment data may cause the search engine to promote the particular search to an extent that is necessary to cause that particular search result to appear no further lower on the initial search results page than the top 3 or so search results.

As a result of the performance of the above technique, search results that point to resources (e.g., web pages, files, videos, music, images, etc.) in which users who submitted a particular original query are known to have previously shown significant interest are displayed more prominently on initial search results pages that the search engine directly returns in response to submissions of that particular original query. Later users who submit the same original query are therefore more likely to find, quickly and easily, the search results that refer to the resources in which other users who submitted the same original query also probably found interesting. The ease and speed with which users can find interesting resources using the search engine generally increases user satisfaction with the search engine, encourages users to use the same search engine to perform additional searches in the future, and may motivate users to recommend the search engine to their friends and associates.

Revised Query Suggestions

As is mentioned above, in one embodiment of the invention, the behavioral navigation trail data that the search engine collects includes revised queries that users submit to the search engine after submitting an original query. Users may submit revised queries to the search engine after submitting an original query because those users believe (perhaps mistakenly) that the search results that have been returned by the search engine in response to the original query do not contain the search results in which the users are interested. In one embodiment of the invention, the last revised query (if any) that the user submitted after submitting the original query (in between which the user might have also submitted one or more intervening revised queries) before a "success" occurred (e.g., due to the user selecting a search result and then not performing additional activity like selecting another search result or returning to the search results page using the browser's "back" control) is specially marked by the search engine. This is the revised query that produced the revised search result page on which the user discovered a "successful" search result. Therefore, an embodiment of the invention recognizes that such a revised query may be usefully suggested to the user as one of possibly several search engine-suggested queries after the search engine has received the original query from the user.

To this end, in one embodiment of the invention, the search engine examines multiple behavior navigation trails (discussed above) that begin with the same original query. The multiple behavior navigation trails may result from the observations of different users' navigation behaviors over a specified period of time. If a particular revised query occurs in at least a specified proportion of those trails as the last revised query in those trails prior to a "success" that occurred in those trails, then that revised query is considered to be a query that the search engine ought suggest as an alternative query in response to any future user's submission of the original query to the search engine. In response to determining, in this manner, that a particular revised query ought to be suggested as an alternative query for the original query, the search engine stores associative query data in which the original query is associated with the particular revised query.

Thereafter, in response to the submission of any query by any user, the search engine consults the associative query data to determine whether the user-submitted query is associated with any alternative query. If the search engine determines that the user-submitted query is associated with one or more alternative queries, then the search engine presents, to the user (e.g., on the initial search results page on which the search engine presents the search results produced based on the user-submitted query) one or more or all of the alternative queries that are associated with the user-submitted query in the associative query data. The user who submitted the original query may then select any one (or none) of the alternative queries presented. The user's selection of an alternative query causes the search engine to perform a new search using the selected alternative query. The search engine subsequently presents, to the user, a revised search results page that contains search results that were determined based on the alternative query.

Although an embodiment of the invention discussed above involves the search engine specially marking only the last revised query in a trail that occurs prior to a "success" in that trail, alternative embodiments of the invention may mark other revised queries that occur within a trail also. In one embodiment of the invention, every revised query that occurs in a trail any time after an original query is considered to be a potential alternative query for association with the original query in the query association data. In such an alternative embodiment of the invention, any revised query that occurs anywhere in at least a specified proportion of the trails that begin with a particular original query is associated with that particular original query within the associative query data, regardless of whether that revised query was the last revised query that the containing trail contained prior to the "success" reached on that trail.

Defining Success

As is discussed above, in one embodiment of the invention, a "success" is defined as being a search result whose selection caused the user's browser application to navigate to a web page or other resource (to which the search result referred) from which the user did not navigate away for at least a specified period of time. For example, in one embodiment of the invention, if a user mouse-clicks on a particular search result's hypertext link, thereby causing the user's browser to retrieve and display a web page to which the hypertext link refers (e.g., by URL), and if the user thereafter does not cause his browser application to navigate away from that web page (e.g., by entering a new URL, or activating the browser's "back" button, or by some other action) for at least sixty seconds (or some other specified temporal period), then the particular search result is considered to be a "success." As is discussed above, such a search result, if it occurs as a "success" in at least a specified proportion of multiple trails that begin with the same original query, is stored in association with the original query in the rank adjustment data.

However, in alternative embodiments of the invention, a "success" may be defined differently, using criteria other than or in addition to the amount of time that a user apparently viewed a web page to which a search result refers. For example, in one alternative embodiment of the invention, a browser toolbar includes a control that a user can activate to indicate that the page currently being displayed by the browser is a page that the user finds interesting. In such an embodiment of the invention, the user's activation of such a control causes the search result that the user previously selected (in order to cause his browser to navigate to the current page) to be considered to be a "success." Thus, successes may be implied from user behavior, or successes may be expressly indicated by user behavior.

Defining an Original Query

As is discussed above, in one embodiment of the invention, each behavioral navigation trail tracked by the search engine begins with an original query. In one embodiment of the invention, an original query is defined as being the first query that a user enters into the search engine's query term box (usually implemented as a hypertext markup language (HTML) field) after his browser application starts up.

However, in at least some embodiments of the invention, an original query might also be a query other than the first query that user entered into the search engine's query term box after his browser application started up. Under some circumstances, a user may start his browser application and navigate to the search engine's query term-entry page (e.g., the "front page" of the search engine's web site) in order to search for a first interest, but then, after having found his first interest, the user may subsequently enter a subsequent query that reflects an entirely different second interest. Such a subsequent query should not be mistakenly interpreted as being a revised query that the user entered after submission of the first query due solely to the fact that the search results returned in response to the first query seemed not to contain a search result that referenced the user's first interest. Instead, such a subsequent query should be understood to be a new original query that should begin a new trail.

Therefore, in one embodiment of the invention, an original query is defined as being either (a) the first query that a user enters into the search engine's query term box after his browser application starts up, as discussed above, or (b) the first query that the user submits to the search engine after the user has experienced as "success." For example, if the criterion for branding a particular search result as a "success" is that the user did not cause his browser to navigate away from the resource to which the particular search result refers for at least sixty seconds, and if the user selects a particular search result, views the web page to which the particular search result refers for more than sixty seconds, and then submits a subsequent query to the search engine, that subsequent query is considered to be a new original query rather than a revised query in the previous trail. The search engine counts the submission of the new original query as the beginning of a new behavior navigation trail that is separate and distinct from the previous trail that ended with the "success."

Example Flow—Data Collection

As is discussed above, in one embodiment of the invention, behavioral navigation trail data is collected for each user of a plurality of users. For example, a "toolbar" application may be installed on each such user's computer. The toolbar application may execute in conjunction with the user's web browsing application ("browser")—potentially as a "plug-in" that the user can instruct his browser to download and install automatically so that the toolbar automatically starts along with the browser every time that the browser is started. Such a toolbar application may keep track of each item, displayed in or by the browser, on which a user mouse-clicks. Such items may include hypertext links that refer to other web pages or objects, and/or buttons (such as the "back" button) of the browser itself. Such a toolbar application also may keep track of each data item that the browser submits over the Internet, including data that a user enters into a query term field of a web page or of the toolbar itself. Additionally, the toolbar application may keep track of each URL that the browser requests. In this way, the toolbar keeps track of the user's behavioral navigation trail. The toolbar may keep track of a time and date on which each user activity was observed, thus preserving a record of the order in which those activities occurred.

FIG. 1 is a flow diagram that illustrates an example of a technique for collecting and reporting a user's behavioral navigation trail, according to an embodiment of the invention. The technique may be performed by a toolbar application executing on the user's computer, for example. The technique may be performed separately on the computers of many different users at different times. Alternative embodiments of the invention may include more, fewer, or different operations that those illustrated by way of FIG. 1.

In block 102, a computerized process detects user activity in the user's browser. The activity may be a mouse-click of an item such as a hypertext link. The hypertext link may be a reference that points to a page that corresponds to a particular search result in a set of search results that a search engine presented to the user via the user's browser, for example. Alternatively, the activity may be the user's submission of query terms via a text entry field that is presented in a web page that the browser is displaying or in a toolbar application that executes in conjunction with the browser. Alternatively, the activity may be the user's mouse-click of a "back" button of the user's browser (or the user's depression of certain keys that cause the browser to perform the same functionality). In most cases, the first user activity to be detected will be the user's submission of original query terms to an Internet search engine.

In block 104, the computerized process records the user activity. For example, details that identify the user activity and the time at which the activity occurred may be stored in a "cookie" or other informational item that the browser maintains. Alternatively, such details may be transmitted immediately after the detection of the activity over the Internet to a server that stores those details.

In block 106, in response to the user activity, the user's browser requests a new resource over the Internet or retrieves a resource from the browser's cache. For example, if the user activity was the user's mouse-click of a hypertext link, then the user's browser typically responsively requests, over the Internet, a web page that is located at a URL that the link specifies. For another example, if the user activity was the user's submission of query terms to an Internet search engine, then the user's browser typically responsively requests, over the Internet, a search results web page that an Internet search engine generates. The search results web page includes search results that the Internet search engine has deemed to be relevant to the submitted query terms. Alternatively, if the user activity was the user's mouse-click of the browser's "back" button, then the browser may retrieve a previously viewed web page (typically, the web page that the browser had been presenting immediately prior to the web page that the browser is currently presenting) from the browser's local cache (e.g., on the user's computer's hard disk drive).

In block 108, the computerized process records the URL of the requested resource. For example, the URL of the requested or retrieved web page may be stored in the "cookie" discussed above, or immediately transmitted to the storage server discussed above.

In block 110, the user's browser receives the requested or retrieved resource and presents the resource to the user. For example, the browser may display a web page that was received over the Internet, or the browser may display a web page that was retrieved from the browser's local cache. If the resource is not a web page, then the browser may present the resource in whatever manner is appropriate to the resource's type, possibly invoking one or more other "helper" applications in the presentation process. For example, if the resource is a movie, then the browser may invoke a movie-playing application to play the movie. For another example, if the resource is an audio file, then the browser may invoke a music-playing application to play the audio file. For another example, if the resource is an executable file, then the browser may request that the computer's operating system execute the program that the file codifies (typically, only with the user's granted permission).

In block 112, a computerized process detects further user activity. For example, the further user activity may include the user clicking on a "back" button of his browser, the user clicking on a control that signifies that he is interested in the content of the currently displayed web page, or the user closing his browser application.

In block 114, the computerized process determines whether the resource most recently presented to the user (e.g., by the browser) corresponds to a "success." For example, if the user activity involved the user either clicking a "back" button of his browser or closing his browser application, then the process may determine whether the amount of time that passed in between the browser's presentation of a web page, in block 110, and the detection of the further user activity, in block 112, exceeds a specified threshold amount of time. If the amount of time that passed does exceed the specified threshold amount under such circumstances, then the search result upon which the user previously clicked in order to cause the web page to be fetched is considered to be a "success." For another example, if the user activity involved the user clicking on a control that signifies his interest in the content of a currently displayed web page, then the search result upon which the user previously clicked in order to cause the web page to be fetched is considered to be a "success." If the resource corresponds to a success, then control passes to block 116. Otherwise, control passes back to block 104.

In block 116, the computerized process generates and records a user behavioral trail based on all of the user activities recorded in each visit to block 104. The user behavioral trail begins with the original query that the user initially submitted in block 102. The remainder of the trail is a sequence of nodes, where each such node is either (a) a URL of a page that the user visited or (b) a set of one or more revised query terms that the user submitted (either by typing the revised query terms into a text entry field or by selecting the revised query terms from an alternative query list presented along with search results). The nodes in the trail are ordered in time-based sequence, beginning with the node that corresponds to the earliest user activity, and ending with the node that corresponds to the latest user activity (which is the node that corresponds to the "success"). Thus, in one embodiment of the invention, the detection of a "success" signifies that a complete user behavioral trail has been learned. If the user behavioral trail is generated at a server (e.g., a server associated with the Internet search engine), then the server may store the user behavioral trail locally at the server. Alternatively, if the user behavioral trail is generated at the user's client system, then the user's client system may transmit the user behavioral trail over the Internet to the server for storage at the server. In one embodiment of the invention, control then passes back to block 102, in which a new and separate user behavioral trail is begun.

Many different such user behavioral trails may be generated over time, from different users. Over time, a corpus of various user behavioral trails accumulates at the Internet search engine's storage facility. As is discussed below, in one embodiment of the invention, for each original query that begins any user behavioral trail in the corpus of trails, all of the stored user behavioral trails that begin with that original query are automatically analyzed in order to discover search results and/or alternative queries that ought to be presented on search results pages that are initially returned in response to users' future submission of that original query to the Internet search engine.

Finding Frequently Selected Search Results and Alternative Queries in Similarly Beginning User Behavioral Trails As is discussed above, in one embodiment of the invention, user behavioral navigation trails are observed, recorded, and stored on a server (e.g., a server that is owned and maintained by an Internet search engine provider). The trails may come from a variety of different users at different times. Some of the trails may begin with the same original query. According to one embodiment of the invention, a computerized process on the server on which the trail data is stored periodically (and asynchronously to users' search activities) processes the accumulated, aggregated trail data in order to discover search results and revised queries that frequently occur in groups of trails that begin with the same original query. If a particular search result appears frequently within trails that begin with a particular original query, then this signifies that the particular search result probably should be featured prominently within an initial search results page that is presented in response to the submission of the particular original query. Similarly, if a particular revised query appears frequently within trails that begin with a particular original query, then this signifies that the particular revised query should be features prominently as a user-selectable alternative query within the initial search results page that is presented in response to the submission of the particular original query.

Figure 2:
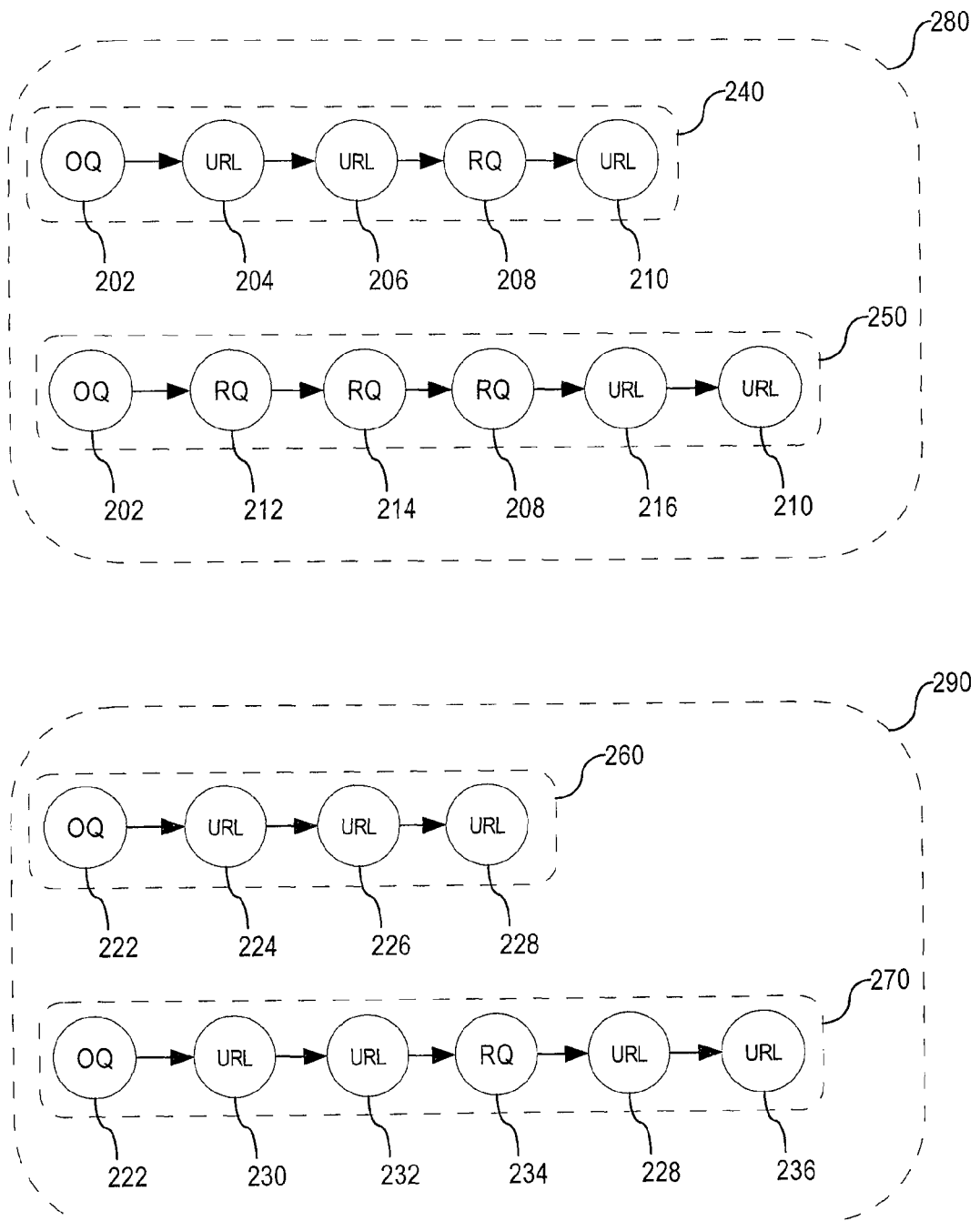
FIG. 2 is a diagram that illustrates groups of user behavioral navigation trails that begin with the same original queries, according to an embodiment of the invention.

FIG. 2 is a diagram that illustrates groups of user behavioral navigation trails that begin with the same original queries, according to an embodiment of the invention. Techniques for finding frequent search results and frequent alternative queries may be understood with reference to the trails shown in FIG. 2. FIG. 2 shows four different user behavioral navigation trails 240, 250, 260, and 270 for purposes of illustration, although the collected trail data clearly may include more trails than those shown in FIG. 2.

Trails 240 and 250 both begin with an original query (OQ) 202, though each of trails 240 and 250 was generated based on a different user's behavior; both users began their search activities by submitting original query 202. Because trails 240 and 250 both begin with the same original query 202, trails 240 and 250 are grouped together into a trail group 280. Trail group 280 includes all trails (and only those trails) that begin with original query 202, and may include many other trails in addition to trails 240 and 250. Each such trail may result from a different user's navigational behavior.

Trails 260 and 270 both begin with an original query (OQ) 222, though each of trails 260 and 270 was generated based on a different user's behavior; both users began their search activities by submitting original query 222. Because trails 260 and 270 both begin with the same original query 222, trails 260 and 270 are grouped together into a trail group 290. Trail group 290 includes all trails (and only those trails) that begin with original query 222, and may include many other trails in addition to trails 260 and 270. Each such trail may result from a different user's navigational behavior.

Thus, in one embodiment of the invention, trails represented in the accumulated stored trail data are periodically grouped into trail groups like trail groups 280 and 290. In one embodiment of the invention, the trail grouping is performed based on the original queries with which each trail begins, such that a particular trail group contains all trails (and only those trails) that begin with a particular original query.

In one embodiment of the invention, for each trail group, URLs and revised queries (RQs) that frequently occur within the trails of that trail group are located. These frequently occurring URLs and revised queries are good candidates for display on the initial search results page that gets presented after a user's submission of the original query with which all trails in the trail group begin. A discussion of the elements of each illustrated trail, and the way in which frequent elements are determined, follows.

Trail group 280 includes trails 240 and 250 (prospectively among many others). Trail 240 begins with original query (OQ) 202. After a user's submission of original query 202, an initial set of search results was returned to that user. The user selected a search result from that set. The search result that the user selected corresponded to a resource located at URL 204. Probably unsatisfied with that resource, the user went back to the initial set of search results and selected another search result. That search result corresponded to a resource located at URL 206. Probably unsatisfied with that resource, the user decided to submit a revised query (RQ) 208. The submission of revised query 208 caused a second set of search result to be returned to that user. The user then selected a search result from that set. The search result corresponded to a resource located at URL 210. Trail 240 ends with URL 210, because the resource corresponding to URL 210 was determined to be a "success."

Trail 250 (also in trail group 280) also begins with original query (OQ) 202. After a user's submission of original query 202, an initial set of search results was returned to that user. Instead of selecting a search result from that set (perhaps because the user could not immediately locate any search result that appeared to be interesting), the user decided to submit a revised query (RQ) 212. The submission of revised query 212 caused a second set of search result to be returned to that user. Instead of selecting a search result from that set, the user decided to submit another revised query (RQ) 214. The submission of revised query 214 caused a third set of search result to be returned to that user. Instead of selecting a search result from that set, the user decided to submit yet another revised query (RQ) 208—which happens also to occur in trail 240. The submission of revised query 208 caused a fourth set of search result to be returned to that user. The user selected a search result from that set. The search result that the user selected corresponded to a resource located at URL 216. Probably unsatisfied with that resource, the user went back to the fourth set of search results and selected another search result. That search result corresponded to a resource located at URL 210—which happens also to occur in trail 240. Trail 250 ends with URL 210, because the resource corresponding to URL 210 was determined to be a "success."

As can be seen from the discussion above, trails 240 and 250 both contain revised query 208 and URL 210. Assuming that the proportion of the trails in trail group 280 that contain revised query 208 is greater than a specified threshold, revised query 280 is determined to be a frequent revised query for trail group 280. As a result, associative query data, stored at the server, is updated to indicate that original query 202 (at which all of the trails of trail group 280 begin) is mapped to revised query 208. Significantly, revised query 208 might not ever have been presented as an alternative query in the initial set of search results that were displayed to the user in response to the submission of original query 202.

Furthermore, assuming that the proportion of the trails in trail group 280 that contain URL 210 is greater than a specified threshold, URL 210 is determined to be a frequent URL for trail group 280. It follows that the search result to which URL 210 corresponds is a frequent search result for trail group 280. As a result, rank adjustment data, stored at the server, is updated to indicate that original query 202 (at which all of the trails of trail group 280 begin) is mapped to URL 210. Significantly, the search result corresponding to URL 210 might not have even been contained in the initial set of search results returned in response to the submission of original query 202. Even if the search result corresponding to URL 210 was contained in the initial set of search results, that search result might have been ranked so far down in the initial set that the chance of the user's seeing and selecting that search result from the initial set might have been extremely low.

Trail group 290 includes trails 260 and 270 (prospectively among many others). Trail 260 begins with original query (OQ) 222, which differs from original query 202. After a user's submission of original query 222, an initial set of search results was returned to that user. The user selected a search result from that set. The search result that the user selected corresponded to a resource located at URL 224. Probably unsatisfied with that resource, the user went back to the initial set of search results and selected another search result. That search result corresponded to a resource located at URL 226. Probably unsatisfied with that resource as well, the user went back to the initial set of search results and selected yet another search result. That search result corresponded to a resource located at URL 228. Trail 228 ends with URL 228, because the resource corresponding to URL 228 was determined to be a "success."

Trail 270 (also in trail group 290) also begins with original query (OQ) 222. After a user's submission of original query 222, an initial set of search results was returned to that user. The user selected a search result from that set. The search result that the user selected corresponded to a resource located at URL 230. Probably unsatisfied with that resource, the user went back to the initial set of search results and selected another search result. That search result corresponded to a resource located at URL 232. Probably unsatisfied with that resource, the user decided to submit a revised query (RQ) 234. The submission of revised query 234 caused a second set of search result to be returned to that user. The user then selected a search result from that set. The search result corresponded to a resource located at URL 228—which happens also to occur in trail 240. However, that user (unlike that user who caused the generation of trail 260) apparently was not completely satisfied with that resource, because the user then went back to the second set of search results and selected another search result. That search result corresponded to a resource located at URL 236. Trail 270 ends with URL 236, because the resource corresponding to URL 236 was determined to be a "success."

As can be seen from the discussion above, trails 260 and 270 both contain URL 228 (though not always as a "success"). Assuming that the proportion of the trails in trail group 290 that contain URL 228 is greater than a specified threshold, URL 228 is determined to be a frequent URL for trail group 290. It follows that the search result to which URL 228 corresponds is a frequent search result for trail group 290. As a result, rank adjustment data, stored at the server, is updated to indicate that original query 222 (at which all of the trails of trail group 290 begin) is mapped to URL 228. Significantly, the search result corresponding to URL 228 might not have even been contained in the initial set of search results returned in response to the submission of original query 222. Even if the search result corresponding to URL 228 was contained in the initial set of search results, that search result might have been ranked so far down in the initial set that the chance of the user's seeing and selecting that search result from the initial set might have been extremely low.

Thus, in one embodiment of the invention, frequent revised queries and frequent search results (or URLs) are determined for each of possibly many different trail groups based on the proportion of trails in that trail group that contain those revised queries and search results (or URLs). All of a particular trail group's frequent revised queries and frequent search results (or URLs) are stored in association with (i.e., mapped to) the original query with which all of that particular trail group's trail begin. As a result, the associative query data eventually contains a set of original query-to-revised query mappings, and the rank adjustment data eventually contains a set of original query-to-URL mappings. The revised queries that are mapped to a particular original query are good candidates for presentation as alternative queries on the initial search results pages that are returned in response to future user submissions of that particular original query. The search results that correspond to URLs that are mapped to a particular original query are good candidates for prominent presentation as search results on the initial search results pages that are returned in response to future user submissions of that particular original query. As will be seen from the discussion below, in one embodiment of the invention, the rank adjustment data and the associative query data is used to adjust or at least influence the content of future search results pages that will be initially returned in response to the submission of future queries.

Example Flow—Search Result Page Adjustment

As is mentioned above, in one embodiment of the invention, the content of a search results page generated by an Internet search engine in response to a user's submission of a query is influenced by rank adjustment data and/or associative query data that is stored at a server (e.g., a server that is owned and maintained by the Internet search engine provider). Techniques described herein ensure that if a URL is associated with a submitted query in the rank adjustment data, then the search result that is associated with that URL will be prominently displayed on (e.g., within the top "N" results of) the initial search results page that is returned in response to the submitted query. Techniques described herein ensure that if a revised query is associated with a submitted query in the associative query data, then the revised query will be contained in the set of alternative queries presented on the initial search results page that is returned in response to the submitted query.

Figure 3:
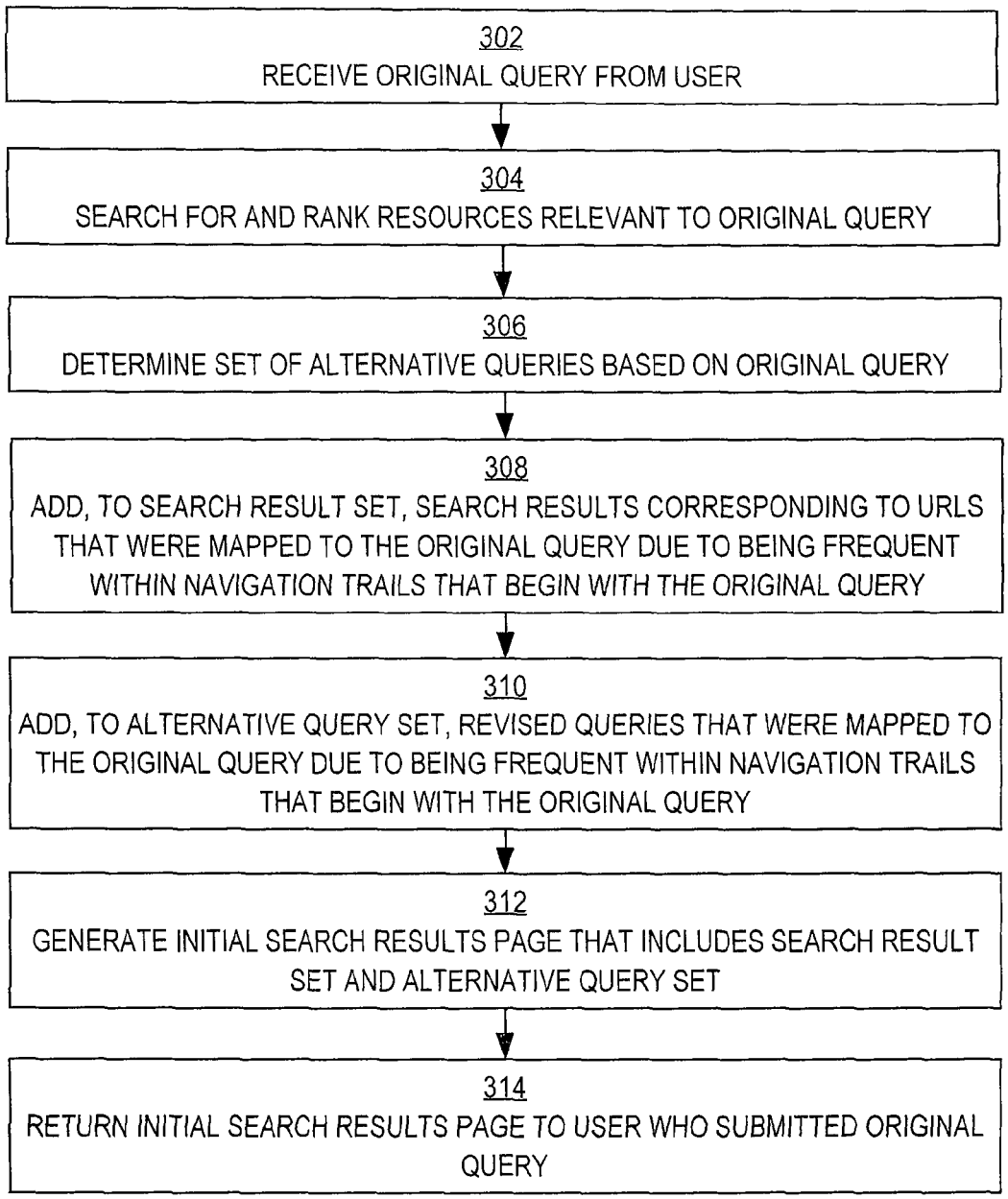
FIG. 3 is a flow diagram that illustrates an example of a technique for generating an initial search results page based on rank adjustment data and associative query data, according to an embodiment of the invention.

FIG. 3 is a flow diagram that illustrates an example of a technique for generating an initial search results page based on rank adjustment data and associative query data, according to an embodiment of the invention. The technique may be performed by an Internet search engine, for example. Alternative embodiments of the invention may include more, fewer, or different operations that those illustrated by way of FIG. 3.

In block 302, the Internet search engine receives an original query that a user submitted to the Internet search engine. The user may submit the original query over the Internet via the user's browser application, for example (potentially through a field present on a toolbar plug-in to that browser application). The user's browser application may send the original query to the search engine within a Hypertext Transfer Protocol (HTTP) request, for example.

In block 304, the Internet search engine searches an index for resources that are associated with one or more of the query terms in the original query. The index typically will have been generated at least in part by an automated web crawling process that indexes resources discovered on the Internet based on the contents (e.g., words) contained within those resources. The Internet search engine includes, within an initial set of search results, resources (or, more specifically, the URLs that refer to those resources) that are associated with one or more of the query terms, as indicated by the index. These are essentially the resources that the search engine has determined to be relevant to the original query. The search engine ranks the resources based on their relevance to the original query.

In block 306, the Internet search engine determines a set of one or more alternative queries. For example, the search engine may search a query log for previously submitted queries that are similar (e.g., contain one or more of the same terms as) the original query.

In block 308, for each URL that is mapped to the original query in the rank adjustment data (discussed above), the Internet search engine places a search result to which that URL refers in the set of search results that were previously determined for the original query in block 304. The search engine promotes the rank of each such URL sufficiently to ensure that each such URL's corresponding search result will be contained within the top "N" search results that are to be presented on the initial search results page (where "N" is some specified number). Significantly, the search results that are placed into the search result set in block 308 might not even have been included within the search result set that was previously generated in block 304; the search results that are placed into the search result set in block 308 might be placed there solely by virtue of their mapping to the original query in the rank adjustment data, and might not even contain any of the query terms from the original query.

In block 310, for each revised query that is mapped to the original query in the associative query data (discussed above), the Internet search engine places that revised query within the set of alternative queries that were previously determined for the original query in block 306. Significantly, the alternative queries that are placed within the alternative query set in block 310 might not even have been included within the alternative query set that was previously generated in block 306; the alternative queries that are placed into the alternative query set in block 310 might be placed there solely by virtue of their mapping to the original query in the associative query data, and might not even contain any of the query terms from the original query.

In block 312, the Internet search engine generates an initial search results page that contains both (a) at least a subset of the ranked search results determined in block 304 and (b) at least a subset of the alternative queries determined in block 306. The search result subset placed on the initial search results page includes the search results that were placed into and/or promoted within the ranked search results due to the operations of block 308. The alternative query subset placed on the initial search results page (as "suggested" or "recommended" queries) includes the alternative queries that were placed into the alternative query set due to the operations of block 310. Thus, without the operations of blocks 308 and 310, some of the search results and alternative queries that end up being placed on the initial search results page might not have been placed there.

Each search result on the initial search results page may include (among other features such as a title and summary) a URL and a hyperlink which, when selected by a user, causes a browser application to navigate to the resource to which the URL refers. Each alternative query on the initial search results page may be formatted as a hyperlink which, when selected by a user, causes the Internet search engine to generate a subsequent set of search results (based on the technique shown in FIG. 3) using the selected alternative query terms as the original query.

In block 314, the Internet search engine returns the initial search results page generated in block 312 to the user who submitted the original query in block 302. For example, the Internet search engine may return the initial search result page to the user's browser application over the Internet in an HTTP response to the HTTP request previously submitted in block 302. In response to the receipt of the initial search results page, the user's browser application may display the initial search results page to the user.

Hardware Overview

Figure 4:
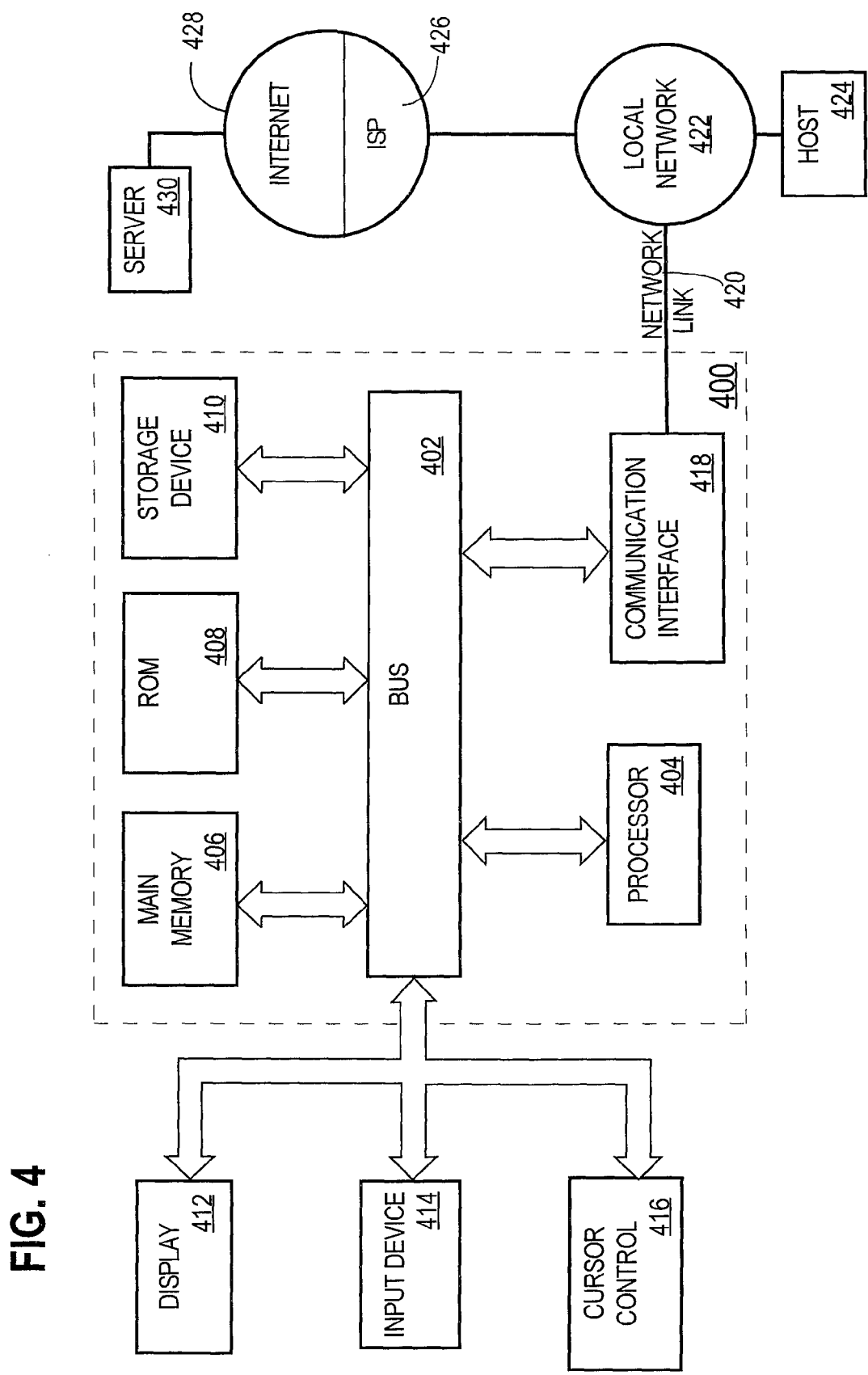
FIG. 4 is a block diagram of a computer system on which embodiments of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. Volatile media and non-volatile media are non-transitory computer storage media. Both volatile media and non-volatile media are non-transitory computer storage media.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Claimed herein is:

1. A computer-implemented method comprising the steps of:
   generating a plurality of navigation trails based on an ordered sequence of navigational activities performed by a plurality of users;
   grouping the plurality of navigation trails into a plurality of navigation trail groups based on original queries with which navigation trails in the plurality of navigation trails begin;
   for at least a particular navigation trail group of the plurality of navigation trail groups, determining one or more uniform resource locators (URLs) or revised queries that occur in at least a specified proportion of navigation trails in the particular navigation trail group;
   generating a search results page based at least in part on the one or more URLs or revised queries that occur in at least a specified proportion of navigation trails in the particular navigation trail group; and
   storing the search results page on a computer-readable storage medium;
   wherein at least one navigation trail in the particular navigation trail group contains at least one URL or revised query that another navigation trail in the particular navigation trail group does not contain; and
   wherein the steps are performed by one or more computing devices.

2. The method of claim 1, wherein generating the plurality of navigation trails comprises:
   recording URLs of resources that a particular user of the plurality of users selected from a set of search results that an Internet search engine returned to the particular user in response to receiving an original query from the particular user; and
   placing the URLs in a particular navigation trail of the plurality of navigation trails;
   wherein the particular navigation trail begins with the original query; and
   wherein the one or more URLs or revised queries include one or more URLs of the URLs in the particular navigation trail.

3. The method of claim 1, wherein generating the plurality of navigation trails comprises:
   recording revised queries that a particular user of the plurality of users submitted to an Internet search engine after the Internet search engine received an original query from the particular user; and
   placing the revised queries in a particular navigation trail of the plurality of navigation trails;
   wherein the particular navigation trail begins with the original query; and
   wherein the one or more URLs or revised queries include one or more revised queries of the revised queries in the particular navigation trail.

4. The method of claim 1, wherein generating the plurality of navigation trails comprises:
   for each search result that a particular user of the plurality of users selected from a set of search results that an Internet search engine returned to the particular user, determining an amount of time that passed in between (a) a moment that the particular user was presented with a resource that corresponds to that search result and (b) a moment that the particular user navigated away from that resource;
   determining whether a particular amount of time that passed in between (a) a moment that the particular user was presented with a particular resource that corresponds to a particular search result and (b) a moment that the particular user navigated away from that particular resource is at least as much as a specified threshold; and
   in response to determining that the particular amount of time is at least as much as the specified threshold, ending a particular navigation trail of the plurality of navigation trail with a URL of the particular search result.

5. The method of claim 1, wherein generating the plurality of navigation trails comprises:
   for each search result that a particular user of the plurality of users selected from a set of search results that an Internet search engine returned to the particular user, determining whether user input that expressed the particular user's interest in a resource to which the search result refers was received from the particular user before a moment that the particular user navigated away from that resource;
   determining whether particular user input that expressed the particular user's interest in a particular resource to which a particular search result refers was received from the particular user before a moment that the particular user navigated away from that particular resource; and
   in response to determining that the particular user input was received from the particular user before the moment that the particular user navigated away from the particular resource, ending a particular navigation trail of the plurality of navigation trail with a URL of the particular search result.

6. The method of claim 1, wherein grouping the plurality of navigation trails into a plurality of navigation trail groups comprises:
   grouping all navigation trails that begin with a first original query into a first navigation trail group of the plurality of navigation trail groups; and
   grouping all navigation trails that begin with a second original query into a second navigation trail group of the plurality of navigation trail groups;
   wherein the first original query differs from the second original query.

7. The method of claim 1, wherein determining the one or more URLs or revised queries that occur in at least a specified proportion of navigation trails in the particular navigation trail group comprises:

determining whether a particular URL, which corresponds to a particular search result that a user selected from a set of search results returned by an Internet search engine on the search results page, occurs in at least a specified proportion of navigation trails in the particular navigation trail group; and in response to determining that the particular URL occurs in at least the specified proportion of navigation trails in the particular navigation trail group, including the particular URL within the one or more URLs or revised queries.

8. The method of claim 1, wherein determining the one or more URLs or revised queries that occur in at least a specified proportion of navigation trails in the particular navigation trail group comprises:

determining whether a particular revised query, which a user submitted to an Internet search engine after submitting an original query with which each of the navigation trails in the particular navigation trail group begin, occurs in at least a specified proportion of navigation trails in the particular navigation trail group; and in response to determining that the particular revised query occurs in at least the specified proportion of navigation trails in the particular navigation trail group, including the particular revised query within the one or more URLs or revised queries.

9. The method of claim 1, wherein generating the search results page based at least in part on the one or more URLs or revised queries that occur in at least a specified proportion of navigation trails in the particular navigation trail group comprises:

determining a set of search results that are relevant to a query that an Internet search engine received from a user;

ranking search results in the set of search results based on relevance of those search results to the query;

in response to determining that a particular URL is mapped to the query within rank adjustment data that were generated based on the plurality of navigation trails, including, within the set of search results, a particular search result to which the particular URL refers;

generating the search results page in which the particular search result appears more highly ranked than one or more other search results from the set of search results; and sending the search results page over the Internet to the user as an initial search results page that the Internet search result engine sent to the user in response to the query.

10. The method of claim 1, wherein generating the search results page based at least in part on the one or more URLs or revised queries that occur in at least a specified proportion of navigation trails in the particular navigation trail group comprises:

determining a set of search results that are relevant to an original query that an Internet search engine received from a user;

in response to determining that a particular revised query is mapped to the original query within associative query data that were generated based on the plurality of navigation trails, including the particular revised query within a set of alternative queries;

generating the search results page on which the set of alternative queries appear in conjunction with one or more search results from the set of search results; and sending the search results page over the Internet to the user as an initial search results page that the Internet search result engine sent to the user in response to the query.

11. A non-transitory computer storage medium storing instructions which, when processed by one or more processors, cause:

generating a plurality of navigation trails based on an ordered sequence of navigational activities performed by a plurality of users;

grouping the plurality of navigation trails into a plurality of navigation trail groups based on original queries with which navigation trails in the plurality of navigation trails begin;

for at least a particular navigation trail group of the plurality of navigation trail groups, determining one or more uniform resource locators (URLs) or revised queries that occur in at least a specified proportion of navigation trails in the particular navigation trail group;

generating a search results page based at least in part on the one or more URLs or revised queries that occur in at least a specified proportion of navigation trails in the particular navigation trail group; and storing the search results page on a computer-readable storage medium;

wherein at least one navigation trail in the particular navigation trail group contains at least one URL or revised query that another navigation trail in the particular navigation trail group does not contain.

12. The non-transitory computer storage medium of claim 11, wherein generating the plurality of navigation trails comprises:

recording URL of resources that a particular user of the plurality of users selected from a set of search results that an Internet search engine returned to the particular user in response to receiving an original query from the particular user; and placing the URLs in a particular navigation trail of the plurality of navigation trails;

wherein the particular navigation trail begins with the original query; and wherein the one or more URLs or revised queries include one or more URLs of the URLs in the particular navigation trail.

13. The non-transitory computer storage medium of claim 11, wherein generating the plurality of navigation trails comprises:

recording revised queries that a particular user of the plurality of users submitted to an Internet search engine after the Internet search engine received an original query from the particular user; and placing the revised queries in a particular navigation trail of the plurality of navigation trails;

wherein the particular navigation trail begins with the original query; and wherein the one or more URLs or revised queries include one or more revised queries of the revised queries in the particular navigation trail.

14. The non-transitory computer storage medium of claim 11, wherein generating the plurality of navigation trails comprises:

for each search result that a particular user of the plurality of users selected from a set of search results that an Internet search engine returned to the particular user, determining an amount of time that passed in between (a) a moment that the particular user was presented with a resource that corresponds to that search result and (b) a moment that the particular user navigated away from that resource;

determining whether a particular amount of time that passed in between (a) a moment that the particular user was presented with a particular resource that corresponds to a particular search result and (b) a moment that the particular user navigated away from that particular resource is at least as much as a specified threshold; and in response to determining that the particular amount of time is at least as much as the specified threshold, ending a particular navigation trail of the plurality of navigation trail with a URL of the particular search result.

15. The non-transitory computer storage medium of claim 11, wherein generating the plurality of navigation trails comprises:

for each search result that a particular user of the plurality of users selected from a set of search results that an Internet search engine returned to the particular user, determining whether user input that expressed the particular user's interest in a resource to which the search result refers was received from the particular user before a moment that the particular user navigated away from that resource;

determining whether particular user input that expressed the particular user's interest in a particular resource to which a particular search result refers was received from the particular user before a moment that the particular user navigated away from that particular resource; and in response to determining that the particular user input was received from the particular user before the moment that the particular user navigated away from the particular resource, ending a particular navigation trail of the plurality of navigation trail with a URL of the particular search result.

16. The non-transitory computer storage medium of claim 11, wherein grouping the plurality of navigation trails into a plurality of navigation trail groups comprises:

grouping all navigation trails that begin with a first original query into a first navigation trail group of the plurality of navigation trail groups; and grouping all navigation trails that begin with a second original query into a second navigation trail group of the plurality of navigation trail groups;

wherein the first original query differs from the second original query.

17. The non-transitory computer storage medium of claim 11, wherein determining the one or more URLs or revised queries that occur in at least a specified proportion of navigation trails in the particular navigation trail group comprises:

determining whether a particular URL, which corresponds to a particular search result that a user selected from a set of search results on a page returned by an Internet search engine on the search results page, occurs in at least a specified proportion of navigation trails in the particular navigation trail group; and in response to determining that the particular URL occurs in at least the specified proportion of navigation trails in the particular navigation trail group, including the particular URL within the one or more URLs or revised queries.

18. The non-transitory computer storage medium of claim 11, wherein determining the one or more URLs or revised queries that occur in at least a specified proportion of navigation trails in the particular navigation trail group comprises:

determining whether a particular revised query, which a user submitted to an Internet search engine after submitting an original query with which each of the navigation trails in the particular navigation trail group begin, occurs in at least a specified proportion of navigation trails in the particular navigation trail group; and in response to determining that the particular revised query occurs in at least the specified proportion of navigation trails in the particular navigation trail group, including the particular revised query within the one or more URLs or revised queries.

19. The non-transitory computer storage medium of claim 11, wherein generating the search results page based at least in part on the one or more URLs or revised queries that occur in at least a specified proportion of navigation trails in the particular navigation trail group comprises:

determining a set of search results that are relevant to a query that an Internet search engine received from a user;

ranking search results in the set of search results based on relevance of those search results to the query;

in response to determining that a particular URL is mapped to the query within rank adjustment data that were generated based on the plurality of navigation trails, including, within the set of search results, a particular search result to which the particular URL refers;

generating the search results page in which the particular search result appears more highly ranked than one or more other search results from the set of search results; and sending the search results page over the Internet to the user as an initial search results page that the Internet search result engine sent to the user in response to the query.

20. The non-transitory computer storage medium of claim 11, wherein generating the search results page based at least in part on the one or more URLs or revised queries that occur in at least a specified proportion of navigation trails in the particular navigation trail group comprises:

determining a set of search results that are relevant to an original query that an Internet search engine received from a user;

in response to determining that a particular revised query is mapped to the original query within associative query data that were generated based on the plurality of navigation trails, including the particular revised query within a set of alternative queries;

generating the search results page on which the set of alternative queries appear in conjunction with one or more search results from the set of search results; and sending the search results page over the Internet to the user as an initial search results page that the Internet search result engine sent to the user in response to the query.

* * * * *